May 20, 1969  D. N. OBENSHAIN  3,445,130
SPLIT MACHINERY HUB

Filed Aug. 23, 1966  Sheet 1 of 2

INVENTOR
David Noel Obenshain

BY  Larry C. Hill
ATTORNEY

May 20, 1969     D. N. OBENSHAIN     3,445,130
SPLIT MACHINERY HUB
Filed Aug. 23, 1966
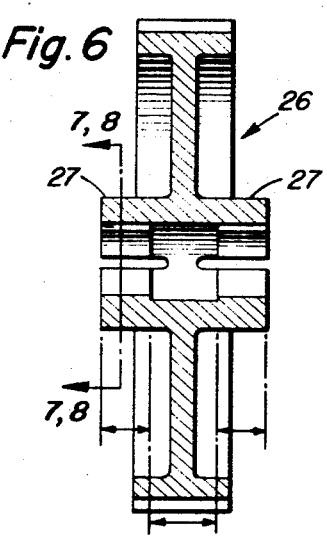
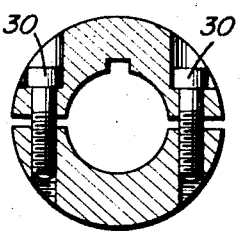
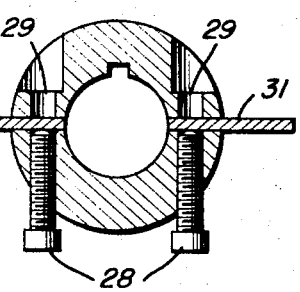
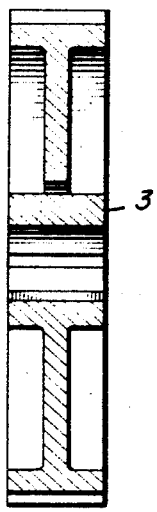
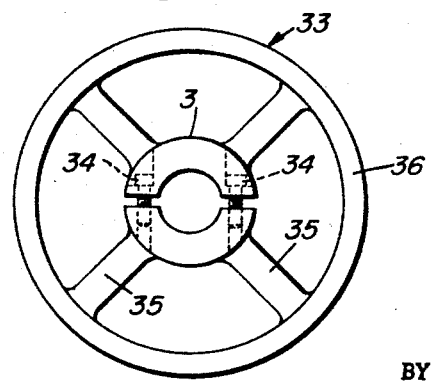
INVENTOR
David Noel Obenshain
BY Larry C. Hall
ATTORNEY

United States Patent Office 3,445,130
Patented May 20, 1969

3,445,130
SPLIT MACHINERY HUB
David Noel Obenshain, Luke, Md., assignor to West Virginia Pulp and Paper Company, New York, N.Y., a corporation of Delaware
Filed Aug. 23, 1966, Ser. No. 574,417
Int. Cl. F16d 1/06
U.S. Cl. 287—52.03                                    1 Claim

ABSTRACT OF THE DISCLOSURE

A machine element hub design is presented which employs a zero clearance bore and a split hub portion including pairs of holes whereby jack screws may be inserted in one set of holes to spread the split hub preparatory to placing the hub on an accomodating shaft, and clamping screws may be inserted in the other set of holes to clamp the hub on the shaft after removing the jack screws.

---

This invention relates to an improved means whereby machine elements may be mounted on machine shafts.

In particular the invention relates to a novel means for mounting a machine element on a shaft so that it has no play or wobble, and is absolutely concentric, and can be easily removed. Shrink mounting, in which the machine element hub is expanded by heat and allowed to cool in place, gives most of these desirable characteristics, except that, once it is installed, it is practically impossible to get it off again.

In the instant case, the machine element hub is mounted on the shaft of a motor used in the paper making industry for slitting, or, trimming the edges of a sheet of paper. The hub is called a slitter hub and has on its peripheral edge a sharpened section called the slitter bell. A slitter knife overlaps the sharpened edge of the slitter bell and the sheet or web of paper passes between the two elements.

The machine element hub design was developed particularly for use in solving the problem of wavy edges which was occurring in the sheets of paper produced by the "AccuTrim" paper machine disclosed more fully in my prior Patent No. 3,203,326. It was found that the major cause of the wavy edges was the wobble of the slitter bells at the edge trimmers. For normal slitting and edge trimming the matter of slitter bell wobble of .005 inch to .010 was not a problem. However, for sheets of "AccuTrim" paper, which were not guillotined trimmed later, this wobble created the so-called wavy edges, which in turn caused misregister in printing when the sheets had to have more than one pass through the printing press.

My solution to this problem was simply to split the hub portion of the slitter hub, and bore it for zero clearance on the motor shaft. The installation of the hub, thereafter simply required separating the parts of the split hub to position it on the shaft, and then release of the split hub parts to allow them to grip the shaft with zero clearance.

Figure 1:
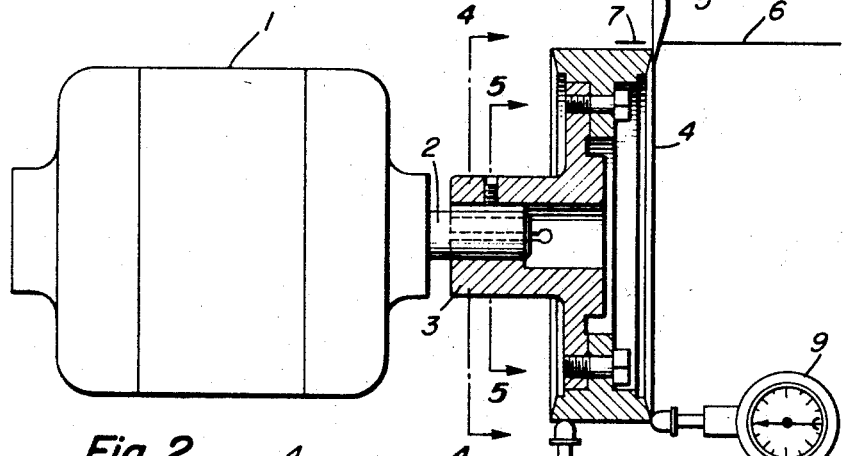
Figure 2:
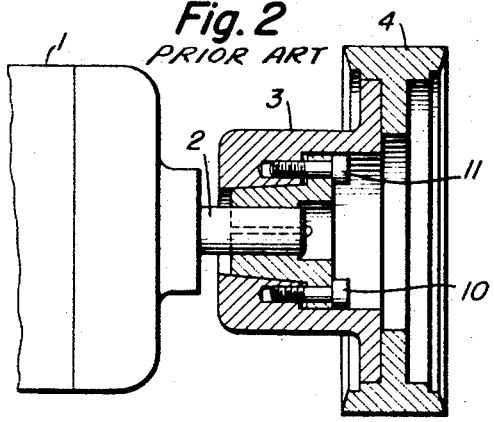
Figure 3:
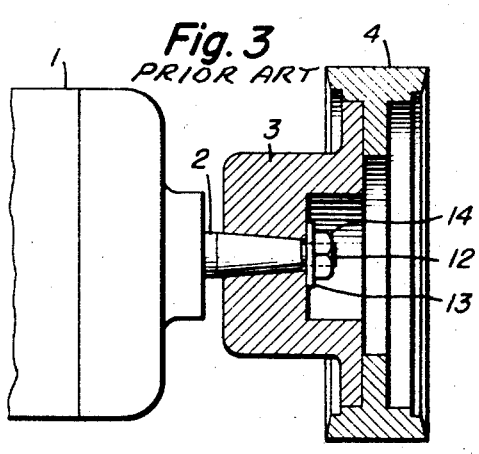
Figure 4:
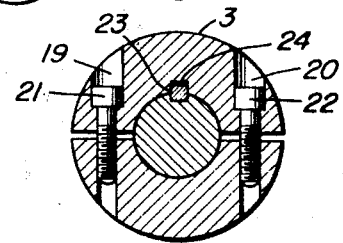
Figure 5:
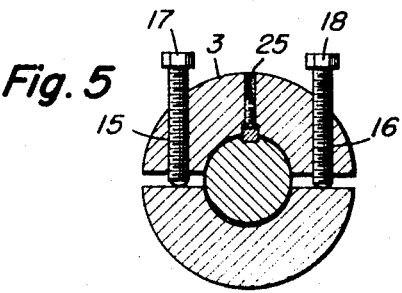

While this novel split hub was developed to solve a particular problem, the principle involved could be used in many applications for mounting machine elements, some of which are hereinafter described in the detailed description taken together with the accompanying drawings, wherein:

FIGURE 1 shows a composite arrangement of the parts of the invention showing the unique split hub;
FIGURE 2 illustrates a taper lock bushing mounting used in the prior art;
FIGURE 3 illustrates a tapered shaft mounting used in the prior art;
FIGURE 4 shows in section a view of FIGURE 1 taken at lines 4—4;
FIGURE 5 shows a sectional view taken at lines 5—5 of FIGURE 1;
FIGURE 6 shows a modified split hub mounting with hub extensions on both sides of the machine element;
FIGURE 7 shows a sectional view taken at lines 7—7 of FIGURE 6 with the clamping screws in place;
FIGURE 8 shows in section a view taken at lines 7—7 of FIGURE 6 with the jack screws in place;
FIGURE 9 shows a side view of the novel split hub mounting where flush hubs are employed;
FIGURE 10 is a view in section taken at lines 10—10 of FIGURE 9; and
FIGURE 11 shows a side view of the novel split hub mounting on a spoked wheel.

Referring more particularly to FIGURE 1, there is shown the various elements required for a paper slitting or edge trimming station. The slitter motor 1 has secured on its shaft 2 a slitter hub 3 employing my novel split hub mounting. A slitter bell or band 4 is attached to the periphery of the slitter hub 3 and a rotary slitter knife 5 slightly overlaps the sharpened edge of the slitter bell as the web of paper 6 passes therebetween. This gives a clean shear slitting action. The edge trim 7 is, of course, discarded leaving a clean, straight edge on the web which will later on be cut into sheets. Obviously the slitter bell 4 must run perfectly true, otherwise, the slit edge will be wavy. Should the web 6 tend to weave going through the slitting station a low frequency wavy edge could also occur.

Dial indicators 8, 9 may be used as shown in FIGURE 1, to measure the T.I.R. (total indicator run-out) in thousandths of an inch. The lateral run-out is the more serious as regards edge wave. Radial run-out can contribute by bouncing the web up and down.

FIGURE 2 shows the means by which our slitter hubs 3 were originally secured to the motor shaft 2. "Taperlock" bushings 10 somewhat as illustrated were used. These bushings were partially split and bored to fit the shaft with a taper on the outside to match the tapered bore of the hub. The tapered bushing 10 was then drawn onto the hub 3 by means of several screws 11, as shown, thus causing the bushing to contract slightly and firmly grip the shaft. This "Taper-lock" mounting means was excellent for many applications, however, with even the most careful tightening of the screws, a lateral T.I.R. could never be attained much better than .005 inch to .010 inch. Tests had shown that for the "AccuTrim" project the wave in the edge of the paper should not exceed .003 inch.

FIGURE 3 shows another type of mounting that was considered to overcome the problems. In this case, the shaft 2 of the motor is tapered and provided with a threaded extension 12. A washer 13 and nut 14 is then used to draw the taper-bored hub 3 onto the shaft. This type of construction has been used by some slitter manufacturers, but the parts require careful machining and a wheel puller is necessary to remove the hub once it is firmly seated.

The solution finally arrived at is shown in FIGURES 1, 4, and 5. The modifications made to the split hub were two in number. First the hub 3 was bored for zero clearance on the shaft 2. This made it impossible, or at least very difficult to mount the hub on the shaft. The second modification was to provide tapped holes 15 and 16 in one half of the split hub as shown in FIGURE 5. Temporary jack screws 17, 18 were then installed in the holes and upon tightening same caused the two parts of the hub to spread apart enabling the hub to be easily slipped onto the shaft. When the hub was positioned properly on the shaft, the screws 17, 18 were loosened and removed allowing the hub parts to spring back and grip the shaft with zero clearance. Additional holes 19, 20 were then provided through both parts of the split hub, FIGURE 4, and clamping screws 21, 22 were installed to insure the gripping action.

Obviously other forms of hub spreading could be used to accomplish the same results as the preferred jack screws and tapped holes arrangement shown.

In FIGURES 1, 4 and 5 there is also shown a refinement of my split hub mounting wherein the shaft 2 is provided with a key 23 which cooperates with the key slot 24 in the hub and is held in place by the set screw 25. The key shown fits neatly at the sides to prevent possible rotation of the hub on the shaft, but, has a slight clearance at the top so that it cannot possibly interfere with the seating of the hub on the shaft.

With this novel hub design we were able to install the hub and bell so that the lateral T.I.R. did not exceed .002 inch. In many cases it did not exceed .001 inch. Radial T.I.R. was as good and usually better. The hub could then be removed and reinstalled a number of times with almost identical T.I.R. readings each time. The jack screws made removal of the hub quite easy, compared with the other precise mounting means then in use.

The principle involved has many other applications where precise mounting, easy installation and easy removal are required. FIGURE 6 shows a gear or pulley 26 with hub extensions 27 on both sides. In this case the jack screws and clamping screws are used on both sides.

FIGURES 7 and 8 taken along section lines 7—7 of FIGURE 6 but at different times show how the jack screws 28 may be used in the same tapped holes 29 used for clamping screws 30. FIGURE 7 shows the clamping screws 30 in place, and FIGURE 8 shows the jack screws 28 being applied in cooperation with a piece of hardened steel plate 31 placed in the slot as shown. The operation is as follows: the steel plate is inserted in the slot and the jack screws are applied to the tapped holes from one direction and are tightened in abutting relationship with the plate to spread the parts of the split hub. The hub is then positioned on the shaft and the jack screws and steel plate are removed to allow the split hub to grip the shaft. The clamping screws are subsequently applied from the opposite direction as shown to the same holes which have been bored through both parts of the split hub. This is done to insure the gripping action. This technique is used where there is not sufficient space available for separate holes for the jack screws and clamping screws. Separate holes are preferable where space will permit.

FIGURES 9 and 10 show the novel split hub design for use on a flush hub machine element. A slot 32 is provided in the web of the hub 3 to permit spreading of the split hub parts when the jack screw is applied. The spreading and clamping technique described with reference to FIGURES 7 and 8 could be used to advantage in this installation.

FIGURE 11 shows a further use of the unique split hub design wherein a spoked wheel 33 is provided with a split hub 3 bored for zero clearance, and provided with jack screw means 34. Flexure of the spokes 35 and rim 36 permits the spreading of the hub by the jack screws.

In each of these applications the bore is made for zero clearance on the shaft. Distortion may occur when the hub is spread, however, this distortion will be relieved when the jack screws are removed and the hub allowed to spring back and grip the shaft. Since the hub is then in firm contact with the shaft, tightening of the clamping screws will cause practically no further distortion.

There is no intention to limit the invention to the specific forms disclosed, but, on the contrary, the intention is to cover all modifications, alternative constructions and equivalents.

I claim as my invention:

1. Means for mounting a machine element on a machine shaft comprising:
  (a) a machine element having a hub portion bored for zero clearance on its machine shaft;
  (b) a radially disposed longitudinal slot formed in said hub portion and extending substantially the entire length of said hub which divides said hub portion into two parts;
  (c) a key slot formed in one part of said hub portion cooperating with a key element on said shaft;
  (d) means securing said key element in said key slot when the hub is on the shaft; and
  (e) two pairs of holes in said hub portion on each side of said zero clearance bore;
    (1) said first pair of holes lying in a common plane located one on each side of said bore and extending in a direction perpendicular to said longitudinal slot, and being bored and tapped in one part only of said hub portion to temporarily receive a pair of jack screws which abut against the opposite part of said hub portion to spread the two parts of said hub portion whereby said hub may be freely slipped onto said machine shaft; and
    (2) said second pair of holes lying in a common plane located one on each side of said bore and extending in a direction perpendicular to said longitudinal slot, and being bored through both parts of said hub portion and tapped in only one part to receive a pair of clamping screws for securing the machine element hub onto said machine shaft after the jack screws are removed.

References Cited

UNITED STATES PATENTS

| | | | |
|---|---|---|---|
| 764,399 | 7/1904 | Villiger | 83—666 |
| 2,287,343 | 6/1942 | Duda | 29—129.3 |
| 2,887,891 | 5/1959 | Perez | 287—52 X |
| 3,127,202 | 3/1964 | Koen | 287—52 |

ANDREW R. JUHASZ, *Primary Examiner.*

U.S. Cl. X.R.

29—159.3; 83—666; 287—53